US012350717B2

(12) United States Patent
Voigt et al.

(10) Patent No.: US 12,350,717 B2
(45) Date of Patent: Jul. 8, 2025

(54) SYSTEM AND METHOD FOR MECHANICALLY CLEANING A SPECTROMETER PROBE

(71) Applicant: Badger Meter, Inc., Milwaukee, WI (US)

(72) Inventors: Henry Voigt, Vienna (AT); Christoph Wagner, Vienna (AT)

( * ) Notice: Subject to any disclaimer, the term of this patent is extended or adjusted under 35 U.S.C. 154(b) by 410 days.

(21) Appl. No.: 17/825,497

(22) Filed: May 26, 2022

(65) Prior Publication Data

US 2023/0381826 A1 Nov. 30, 2023

(51) Int. Cl.
| B08B 13/00 | (2006.01) |
| B08B 1/16 | (2024.01) |
| B08B 1/30 | (2024.01) |
| B08B 1/50 | (2024.01) |
| B08B 5/02 | (2006.01) |
| G01N 21/31 | (2006.01) |

(52) U.S. Cl.
CPC ............... B08B 1/165 (2024.01); B08B 1/30 (2024.01); B08B 1/50 (2024.01); B08B 5/02 (2013.01); G01N 21/31 (2013.01)

(58) Field of Classification Search
None
See application file for complete search history.

(56) References Cited

U.S. PATENT DOCUMENTS

| 3,844,661 A | 10/1974 | Birkett et al. |
| 4,074,217 A | 2/1978 | Yanagawa |
| 5,185,531 A | 2/1993 | Wynn |
| 6,452,672 B1 | 9/2002 | Trainoff |
| 2020/0386669 A1* | 12/2020 | Lahdesmaki .......... G01N 21/05 |

FOREIGN PATENT DOCUMENTS

| CN | 108840381 A | 11/2018 |
| CN | 213633411 U | 7/2021 |
| CN | 215866650 U | 2/2022 |
| CN | 216594291 U | 5/2022 |

OTHER PUBLICATIONS

Google Patents translation of CN213633411U (Year: 2024).*
Google Patents translation of CN216594291U (Year: 2024).*
Can Messtechnik GMBH, Automatic Cleaning for every Application, 2016, retrieved from internet, [URL: https://www.s-can.at/wp_contents/uploads/2021/09/flyer_cleaning_devices_en_2016_05_web.pdf], pp. 1-2.
International Search Report and Written Opinion dated Sep. 15, 2023 for PCT/US2023/023485, 10 pages.

* cited by examiner

*Primary Examiner* — Eric W Golightly
(74) *Attorney, Agent, or Firm* — Boyle Fredrickson SC

(57) ABSTRACT

A cleaning system can be used for cleaning the emitting and receiving units in a measurement section of a spectrometer probe. The cleaning system includes a cleaning instrument including a blade, cleaning lamellas extend outward from the blade, a cleaning instrument actuator including a piston imparting linear motion to the cleaning instrument during a cleaning operation and an attachment adapter configured to attach the cleaning instrument actuator to the spectrometer probe at a flow cell window aperture. The adapter includes an adapter body to receive and allow through passage of the cleaning instrument when it is attached to cleaning instrument actuator and to position the cleaning instrument relative to a measurement section between emitting and receiving units of the spectrometer probe.

6 Claims, 5 Drawing Sheets

SYSTEM AND METHOD FOR MECHANICALLY CLEANING A SPECTROMETER PROBE

FIELD OF THE INVENTION

This invention relates to a mechanical system and method for cleaning probe windows between optical emitters and detectors of a spectrometer probe. More particularly, the invention is directed to a system and method for mechanically cleaning probe windows between optical emitters and detectors using a mechanical cleaning device inserted and operated between the emitter and detector for the spectrometer probe.

BACKGROUND

Spectrometer probes are instruments that can measure optical spectra directly in liquid or gaseous media. The substances contained in the medium weaken a light beam emitted by a lamp that moves through the medium. After contact with the medium, its intensity is measured by a detector over a range of wavelengths specific to the application. A spectrometer measures light and provides an image (or graph) of the light output. The incoming light is broken down and spread across a sensor array which separates out each wavelength and then scales it based on the sensor's sensitivity and the incoming signals amplitude.

Spectrometers can be used in combination with a flow cell to allow the spectrometer probe to continuously and/or periodically measure light transmission through a flowing liquid or gas. Flow cells are sample cells designed so that samples can be continuously flowed through the beam path. This is useful for continuous processes to be monitored or samples that can be damaged by the light source. A new sample is continually replenished so that a fresh sample is available for the next measurement. It is also useful for situations where the sample varies continuously, such as a gradually changing concentration. A flow cell may include an optically clear cover slip or window which is attached to the base piece by a means that allows for fluid flow.

Over time, build-up will occur when using a spectrometer probe with a continuously refreshing sample. For example, build up may develop on the spectrometer probe windows between the emitter and detector of the spectrometer probe. Alternatively, build up can develop on a flow cell window that is part of a flow cell as is typical in laboratory spectrometers. This build-up will affect the measured light and interfere with the accuracy of the probe. Accordingly, the windows must periodically be cleaned.

Currently, the spectrometer probes are cleaned using a combination of non-mechanical, such as ultrasonic or compressed air cleaning, and mechanical cleaning. Non-mechanical cleaning may typically be used without disassembly of the flow cell and/or removal of the spectrometer probe. Non-mechanical cleaning includes, for example, injecting compressed air into the flow cell displacing liquid from the chamber and at least a portion of any solid particles, deposits, build-up, etc. in the chamber. The non-mechanical cleaning effect on the windows is achieved by particles from the displace liquid being blown against the windows. If the water is very clean than no cleaning effect can be seen. Further, non-mechanical cleaning has limits in its effectiveness for removing build-up. Yet further still, using compressed air in cleaning may not be viable since introduction of air in some systems is prohibited.

If non-mechanical cleaning isn't effective enough or not allowed, operators typically use mechanical cleaning which requires removal of the spectrometer probe and/or the use of specialized cleaning systems that can entail re-piping of the flow system and replacement of the flow cell. Mechanical cleaning typically includes scrubbing the emitter and detector using a cleaning instrument to remove any deposits or build up on the devices.

What is needed is an improved mechanical cleaning system and method for efficiently cleaning probe windows between emitters and detectors of a spectrometer probe and/or windows of a flow cell. What is further needed is such a system and method configured to increase cleaning quality and efficiency.

SUMMARY OF THE INVENTION

This invention provides a system and method for mechanical cleaning optical emitters and detectors using a mechanical cleaning device inserted and operated between the emitter and detector within a flow cell for the spectrometer probe. The mechanical cleaning device includes a blade having protruding cleaning extensions, such as lamellas, brushes, bristles, etc., moved in contact with the spectrometer probe windows between the emitters and detectors.

In one more detailed aspect, a cleaning system can be used for cleaning the emitting and receiving units in a measurement section of a spectrometer probe. The cleaning system includes a cleaning instrument including a blade, cleaning extensions extend outward from the blade, a cleaning instrument actuator including a piston imparting linear motion to the cleaning instrument during a cleaning operation and an attachment adapter configured to attach the cleaning instrument actuator to the spectrometer probe at a flow cell window aperture. The adapter is configured to attach to a flow cell at a flow cell window and includes an adapter body to receive and allow through passage of the cleaning instrument when it is attached to cleaning instrument actuator and to position the cleaning instrument relative to a measurement section between emitting and receiving units of the spectrometer probe.

In an exemplary embodiment, the attachment adapter is configured to attach to the spectrometer through a flow cell. The attachment adapter may attach to the flow cell at a flow cell window aperture upon removal of a flow cell window.

In another exemplary embodiment, the cleaning instrument actuator is configured to drive the cleaning instrument forward at a first rate of speed and backward at a second rate of speed. In another exemplary embodiment, the cleaning system includes a compressed air cleaning system configured to operate during the cleaning of the emitting and receiving units of the spectrometer probe.

In another exemplary embodiment, the cleaning instrument actuator further includes a cleaning diaphragm positioned between the attachment adapter and the spectrometer probe. In this embodiment, the cleaning instrument actuator may be configured to drive the cleaning instrument forward and backward through the cleaning diaphragm to clean the cleaning instrument.

Other aspects of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE INVENTION

Figure 1:
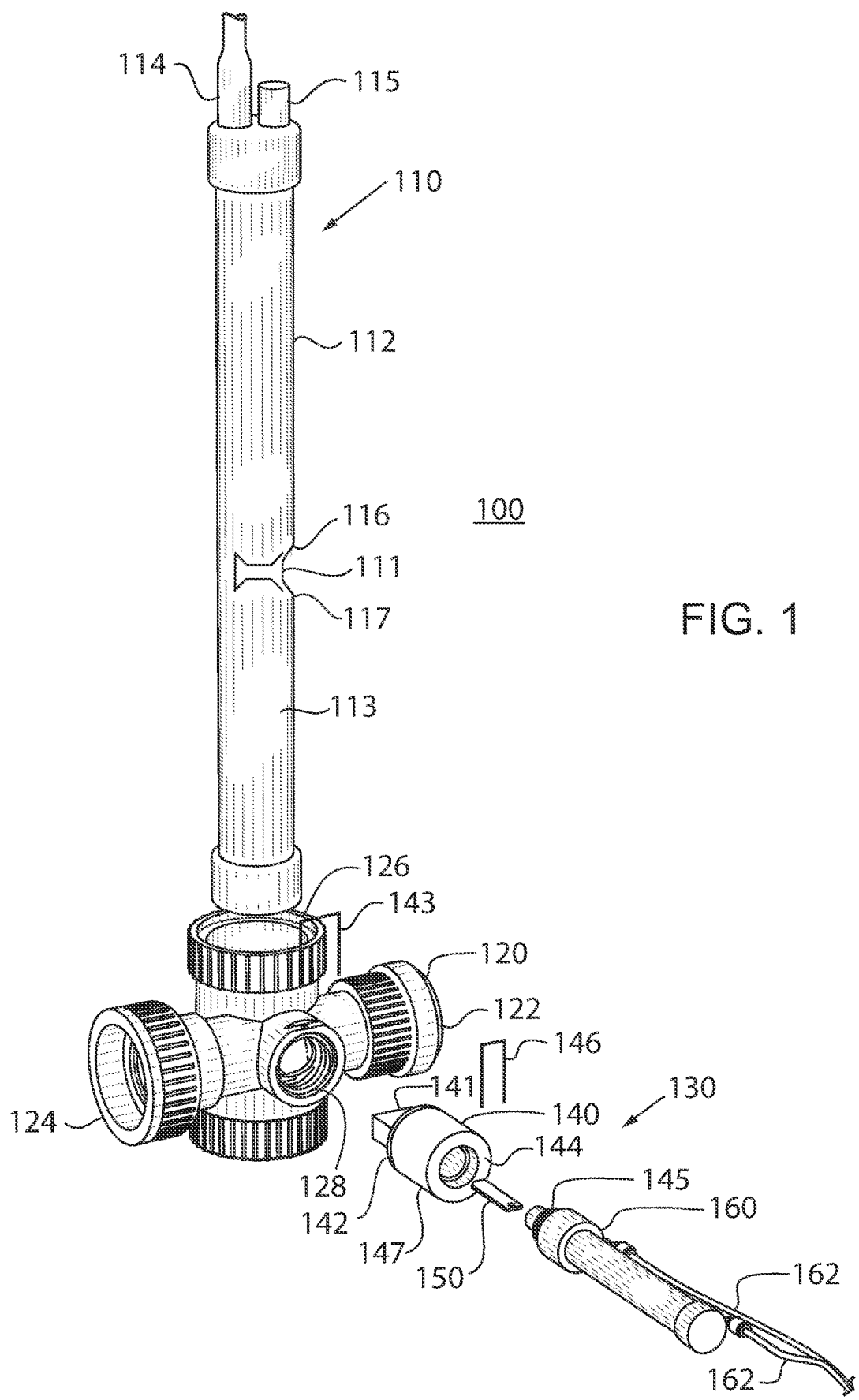
FIG. 1 is an exploded view of a mechanical cleaning system for a spectrometer probe system, according to an exemplary embodiment.

Referring first to FIG. 1, an exploded view of a mechanical cleaning system 130 for a spectrometer probe system 100 is shown, according to an exemplary embodiment. The cleaning system 130 may be used to provide enhanced cleaning for any type of spectrometer probe 110 within a flow cell 120. The cleaning system 130 includes an attachment adapter 140, a cleaning instrument 150, and a cleaning instrument actuator 160.

Spectrometer probe 110 and flow cell 120 provide a device for detecting one or more qualities for a liquid in a supply pipe (not shown), in particular for detecting the water qualities of a fluid in a fluid conduit, comprising a flow cell 120, which has an inlet opening 124, an outlet opening 122 and at least one receiving device 126 for the arrangement of at least one sensor. Using the spectrometer probe 110 and flow cell 120, quality of liquids is detected by receiving a flow of liquid at the inlet opening 124, analyzing the portion of the flow within the flow cell 120 using the spectrometer 110, and providing the tested portion to the outlet opening 122 in a continuous flow process. In alternative embodiments, cleaning system 130 may be configured to include a shut-off valve to allow for sample testing and disposal of the sample to prevent reintroduction of the tested sample into the continuous flow.

Spectrometer probe 110 is shown as a particular example of a sensor positioned within a flow cell 120 for testing a liquid in a continuous flow process. Spectrometer probe 110 includes a measuring section 111, which is positioned between emitting and receiving units 112 and 113, respectively, the emitted light passes through the medium to be analyzed. Substances present in the liquid located in the measuring section 111 at the time of measurement absorb light affecting the received light at receiving unit 126.

Spectrometer probe 110 further includes first and second probe windows 116 and 117. These windows are between the emitting and receiving units 112 and 113 and the measuring section 111 and allow light to pass therebetween.

Spectrometer probe 110 includes a data connection 114 configured to transmit readings for analysis. Based on the readings, probe 110 may be used to detect one or more values indicative of water quality including, but not limited to, nitrite (NO2−), nitrate (NO3−), chemical oxygen demand (COD), biological oxygen demand (BOD), total organic carbon (TOC), benzene, toluene, xylene, phenol, dissolved organic carbon (DOC), turbidity, total dissolved solids (TSS), color, etc.

According to an alternative embodiment, not shown in FIG. 1, spectrometer probe 100 may include a compressed air intake port 115. The compressed air may be used in an air cleaning operation as described above in the background. In an alternative embodiment, as described in further detail below, the compressed air may be used in combination with the mechanical cleaning operation described herein.

Although spectrometer probe 110 is shown as a particular type and size of spectrometer probe, it should be understood that the present invention may be used with a variety of sizes and types of spectrometers. In a preferred embodiment, spectrometer probe 110 is a 1 mm or 5 mm spectrometer probe.

As stated above, flow cell 120 includes an inlet opening 124, an outlet opening 122, and at least one receiving device 126 for the arrangement of at least one sensor, spectrometer probe 110 in the embodiment shown. In the embodiment shown, flow cell 120 includes a flow cell window aperture 128. Flow cell window aperture 128 is configured to receive a flow cell window (not shown) during normal operation allowing a user to inspect the windows 116 and 117 during the normal operation. During cleaning, the flow cell window can be removed from the flow cell window aperture 128. Flow cell 120 includes a flow path that roughly matches the flow path of the attached fluid conduit(s) that allow viewing and additional measurement and analysis of flowing fluids and gases through the flow cell window aperture 128. In the embodiment shown in FIG. 1, the window of flow cell 120 is removed from the flow cell window aperture 128 to facilitate attachment and operation of the cleaning system 130.

In alternative embodiments, and as further described below with reference to FIG. 4, cleaning system 130 may be used independent from a flow cell 120. For example, a cleaning system 130 may be advantageous in environments requiring additional protection and/or a sealed system. Although flow cell 120 is shown as a particular type and size of spectrometer probe, it should be understood that the present invention may be used with a variety of sizes and types of spectrometers.

Cleaning system 130 includes attachment adapter 140, a cleaning instrument 150 and a cleaning instrument actuator 160 in an exemplary embodiment for use with a flow cell 120 having a removable window at flow cell window aperture 128. Attachment adapter 140 is configured to facilitate the attachment of cleaning instrument actuator 160 to the flow cell 120 and to facilitate positioning of the cleaning instrument 150 relative to measuring section 111. Cleaning instrument 150 is described in further detail below with reference to FIGS. 2A and 2B.

Attachment adapter 140 includes a flow cell connection 141 configured to mate with flow cell window aperture 128. Flow cell connection 141 includes an adapter O-ring 142 such that the attachment adapter 140 will form a gas and fluid tight connection with flow cell 120 when attached. A flow cell pin 143 is received by flow cell 120 when the adapter is in the attached position to secure the adapter 140 to the flow cell 120.

Attachment adapter 140 further includes an actuator connection 144 configured to mate with cleaning instrument actuator 160. Actuator connection 144 is configured to receive actuator 160 that includes an actuator O-ring 145 such that the attachment adapter 140 will form a gas and fluid tight connection with cleaning instrument actuator 160 when attached. An instrument actuator pin 146 is received by adapter 140 when the adapter is in the attached position to secure the adapter 140 to the cleaning instrument actuator 160.

Attachment adapter 140 further includes an adapter body 147. Adapter body 147 is configured to receive and allow through passage of the cleaning instrument 150 when it is attached to cleaning instrument actuator 160. Adapter body 147 is further configured to position the cleaning instrument 150 relative to flow cell 120 and spectrometer probe 110 such the cleaning instrument 150 is aligned with measurement section 111 to be inserted between emitting and receiving units 112 and 113.

Cleaning instrument actuator 160 is a piston configured to produce linear motion based on compressed air supplied by an air compressor. Cleaning instrument 160 may be implemented as a closed system having a stainless-steel casing to facilitate submerged operation. Advantageously, where spectrometer 110 includes a compressed air cleaning system, the compressor for the compressed air cleaning system can also be used to drive the cleaning instrument actuator 160. Actuator 160 includes two compressed air inputs 162 and 164 to allow actuator 160 to alternatively drive the cleaning instrument forward (164) and backward (162) or around in a circular or roughly circular motion.

In an exemplary embodiment, a controller (not shown) or manual input can be used to drive the actuator at different speeds dependent on the operation of the cleaning instrument 150. For example, the controller may be configured to drive the cleaning instrument 150 more slowly in the forward direction when the cleaning instrument 150 is entering the measurement section 111. This relatively slower motion can reduce the possibility of having the cleaning instrument 150 damage the emitting and receiving units 112 and 113 and/or windows 116 and 117. The controller may be configured to drive the cleaning instrument 150 more quickly in the reverse direction when the cleaning instrument 150 is exiting the measurement section 111. This relatively quicker motion can improve the cleaning performed by the cleaning instrument 150. The controller may use a digital signal to a valve receiving air output from the compressor to implement this functionality.

In an alternative embodiment, and dependent on the implementation of flow cell 120 and cleaning instrument actuator 160, adapter 140 can provide different connection types. For example, an alternative adapter 140 may be configured to screw onto a flow cell 120 to form the connection.

In operation, following attachment of the cleaning instrument 130 to the flow cell 120, a controller can implement a cleaning operation. The cleaning instrument 150 is used to apply mechanical cleaning to the window 116 and 117 of emitting and receiving units 112 and 113. The cleaning instrument actuator 160 is driven to move the cleaning instrument into and out of the measurement section 111.

In another embodiment, a compressed air cleaning system may be used in combination with the mechanical cleaning system to enhance the mechanical cleaning system. Specifically, the compressed air system received at compressed air intake port 115 may be used to clean the cleaning instrument 150 during the mechanical cleaning operation. During operation, debris or build up removed from the windows 116 and 117 between emitting and receiving units 112 and 113 may adhere to the cleaning instrument 150. To clean the cleaning instrument 150, the compressed air system may be used to also remove any debris or build up from the cleaning instrument 150 in the same manner as used to clean windows 116 and 117. The compressed air cleaning may be operated continuously during mechanical cleaning or periodically, such as when the cleaning instrument 150 has been retracted from the measurement section 111 into the adapter 140.

Advantageously, flow cell 120 does not need to be removed from the spectrometer 110 during the cleaning operation of cleaning system 130. Cleaning system 130 can be removably attached to flow cell 120 at the flow cell window aperture 128. Further, the existing air compressor for a compressed air cleaning system can also be reused during the cleaning operation as well as during normal operation. Cleaning system 130, through attachment and operation at flow cell window aperture 128, can be used to perform and complete the cleaning operation within a few minutes compared to the time required for changing an entire measurement setup.

Figure 2A:
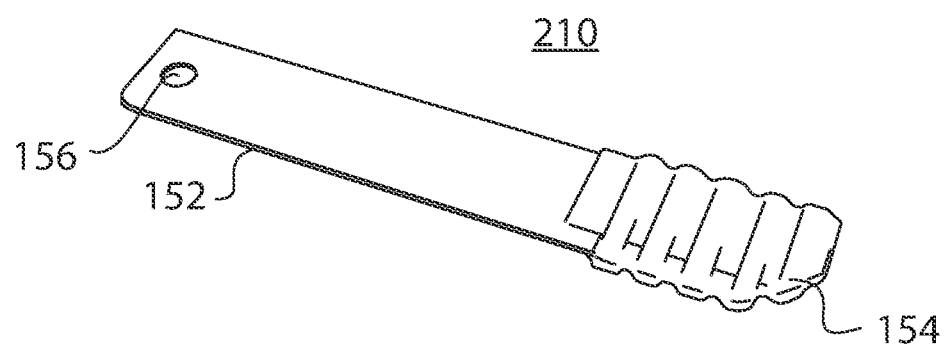
FIGS. 2A-B are examples of alternative cleaning instruments for the mechanical cleaning system of FIG. 1, configured for cleaning probe windows between emitting and receiving units of the spectrometer, according to an exemplary embodiment.
Figure 2B:
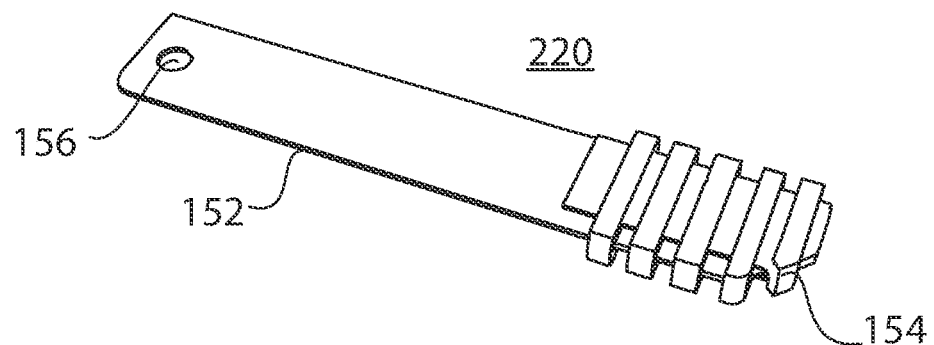

Referring now to FIGS. 2A and 2B, alternative embodiments of cleaning instrument 150 are shown, according to exemplary embodiments. Cleaning instrument 150 include a cleaning blade 152, cleaning extensions 154 and attachment apertures 156.

In the embodiment show in FIGS. 2A and 2B, cleaning extensions 154 are shown and will be described herein as cleaning lamellas 154. It should be understood that cleaning extensions 154 may be any extensions outward blade 152 having length and rigidity to facilitate the cleaning of windows 116 and 117. Other types of extensions can include, but are not limited to, bristles, brushes, etc.

FIG. 2A is a cleaning instrument 210 configured to use with a 1 mm spectrometer. FIG. 2B is a cleaning instrument 220 configured to use with a 5 mm spectrometer. As shown in FIGS. 2A and 2B, blade 152, lamellas 154 and attachment aperture 156 may be modified as needed based on the particular application, size of spectrometer probe 110, dimensions of measurement section 111, types of emitting and receiving units 112 and 113, etc.

Cleaning blade 152 is a rectangular blade configured to support the cleaning lamellas 154 and including the attachment aperture 156 to attachment to cleaning instrument aperture 160. Cleaning blade 152 may be formed of stainless steel to allow for utilization in submersed installations as described below with reference to FIG. 4. Blade 152 may be flexible to allow for slight deflection of the blade 152 when the blade is being inserted into the measuring section 111 to avoid any damage to the emitting and receiving units 112 and 113.

Cleaning lamellas 154 are configured such that the lamellas 154 extend outward in opposite directions from blade 152. Lamellas 154 extend farther outward from blade 152 than the distance between the emitting and receiving units 112 and 113. Accordingly, when the cleaning instrument 150 is inserted into the measuring section 111, the lamellas 154 will be compressed against emitting and receiving units 112 and 113 to clean windows 116 and 117 on those units. Lamellas 154 are provided with a height and thickness to maximize cleaning pressure against windows 116 and 117 while also avoiding any damage to those units.

Figure 3:
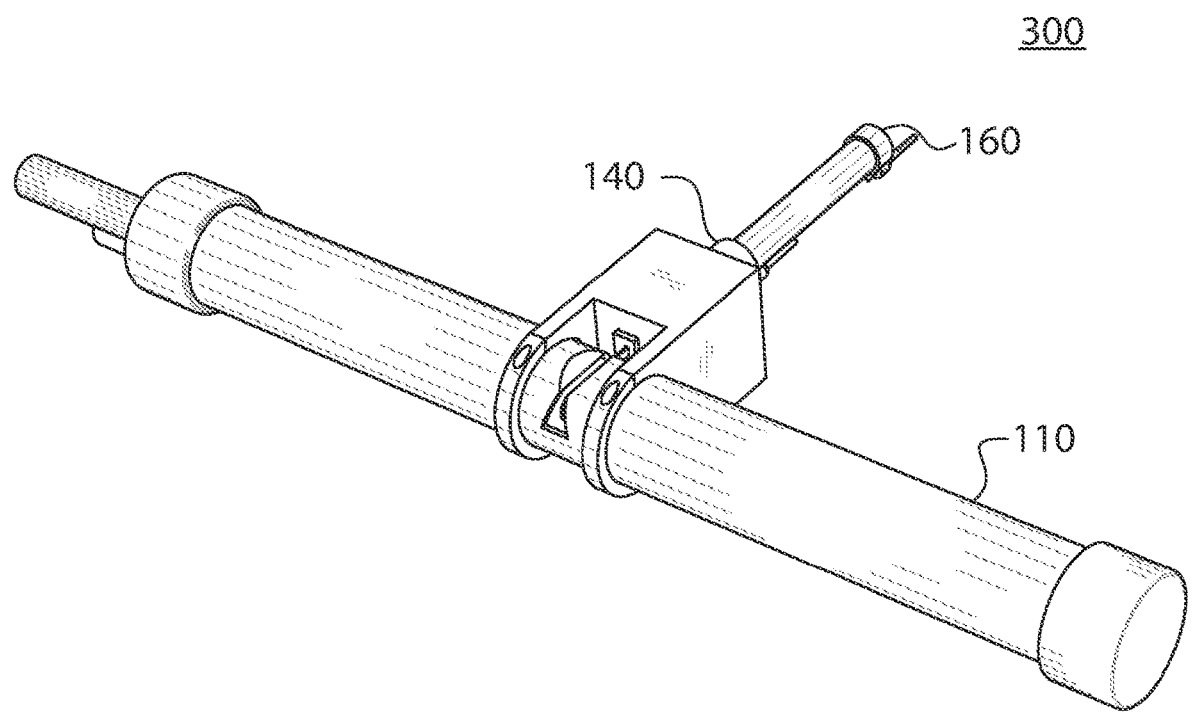
FIG. 3 is an embodiment of the cleaning system of FIG. 1 configured for a submerged operation, according to an exemplary embodiment, according to an exemplary embodiment.

Referring now to FIG. 3, a cleaning system 400 configured for a submerged operation is shown, according to an alternative embodiment. As shown in this embodiment, cleaning system 130 may be used without a flow cell 120 such as in a submersed environment. In this embodiment, connection adapter 140 may be configured to be secured directly to the spectrometer probe 110.

Figure 4A:
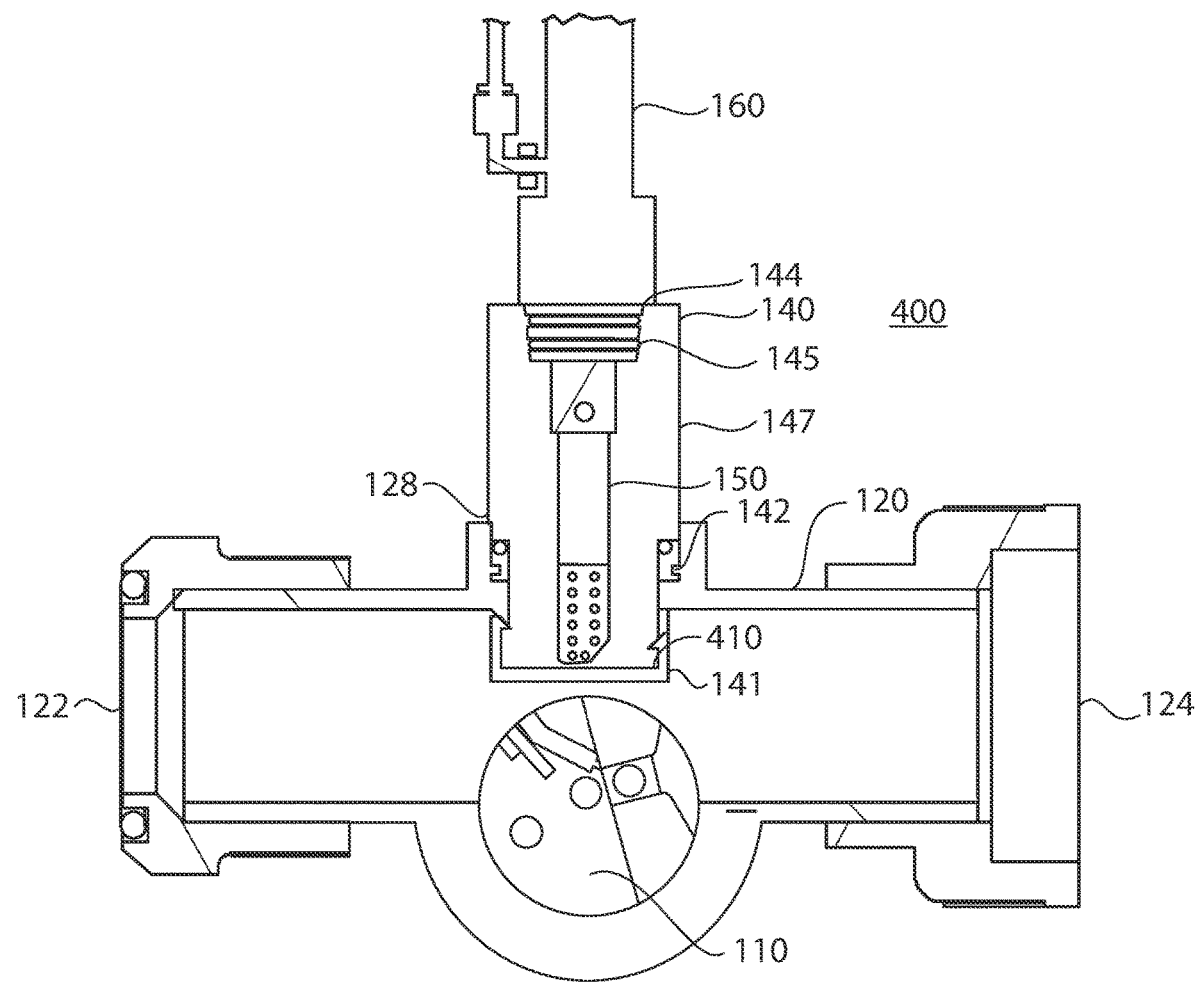
FIGS. 4A and 4B are cross section and perspective views of an alternative embodiment of the cleaning system of FIG. 1 including a cleaning mechanism, according to an exemplary embodiment.

Referring now to FIG. 4A, a cross section view of an augmented cleaning system 400 including a cleaning diaphragm 510 is shown, according to an exemplary embodiment. Although a particular embodiment is shown, it should be understood that a variety of implementations and configurations may be used to achieve the functionality described herein. For example, cleaning diaphragm 510 may be any of a variety of cleaning mechanisms to clean blade 150 such as bristles.

Figure 4B:
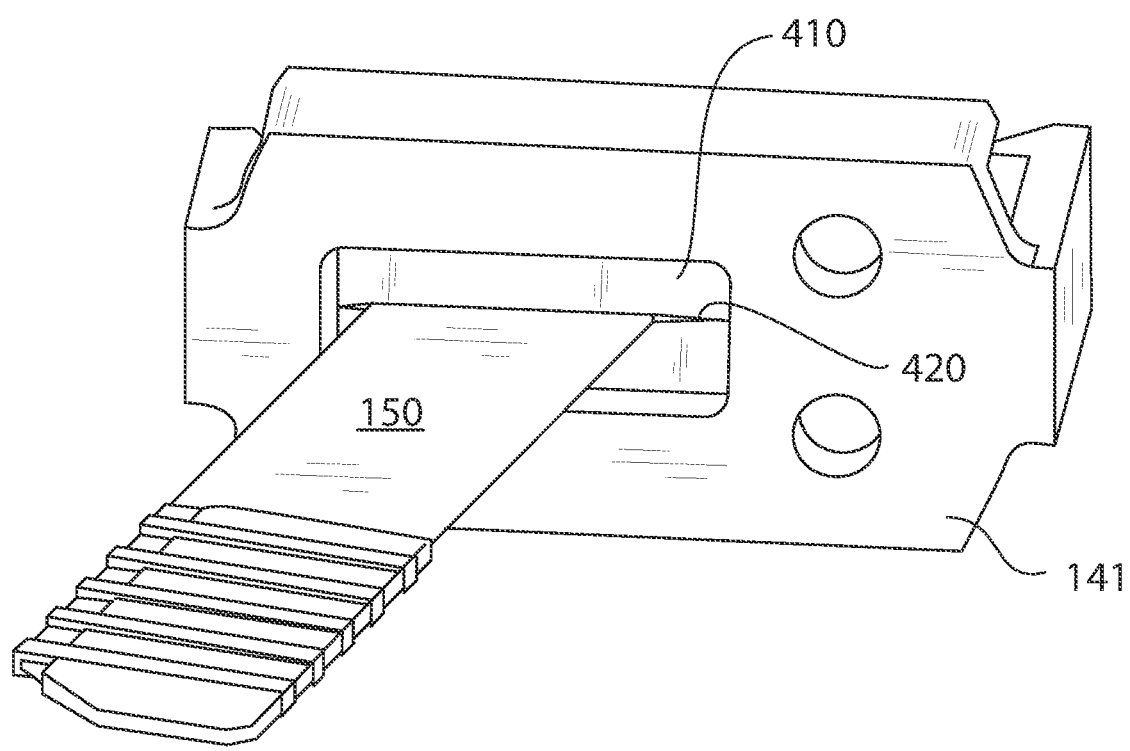

Referring now also to FIG. 4B, adapter 140 may be configured to include a system to clean the cleaning instrument 150. In the embodiment shown, flow cell connection 141 may be configured to include a cleaning diaphragm 410. Cleaning diaphragm 410 may be a rubber sheet approximately 1 mm thick including a slit 420 through which cleaning instrument 150 passes during operation. The slit 420 and cleaning diaphragm 410 may be configured to apply pressure against the cleaning instrument 150 and lamellas 154 to remove any debris or build up cleaned from the emitting and receiving units 112 and 113 but adhering to the cleaning instrument 150. Additionally, diaphragm 410 forms a shelter with adapter 140 where the cleaning instrument 150 is shielded from the medium in the retracted position.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A cleaning system for cleaning spectrometer probe windows respectively attached to emitting and receiving units of a spectrometer probe, comprising:
   a cleaning instrument including a blade and cleaning extensions extending outward from the blade;
   a cleaning instrument actuator including a piston imparting linear motion to the cleaning instrument during a cleaning operation; and
   an attachment adapter including a flow cell window aperture attachment mechanism that attaches the cleaning instrument actuator to the spectrometer probe at a flow cell window aperture that is exposed following removal of a flow cell window, the adapter including an adapter body to
   receive and allow through passage of the cleaning instrument through the flow cell window aperture when the cleaning instrument is attached to the cleaning instrument actuator and
   to position the cleaning instrument relative to a measurement section between emitting and receiving units of the spectrometer probe.

2. The system of claim 1, wherein the cleaning instrument actuator is configured to drive the cleaning instrument forward at a first rate of speed and backward at a second rate of speed.

3. The system of claim 1, further including a compressed air cleaning system configured to operate during the cleaning of spectrometer probe windows respectively attached to the emitting and receiving units of the spectrometer probe.

4. The system of claim 1, wherein the cleaning instrument actuator further includes a cleaning mechanism positioned between the attachment adapter and the spectrometer probe.

5. The system of claim 4, wherein the cleaning instrument actuator is configured to drive the cleaning instrument forward and backward through the cleaning mechanism to clean the cleaning instrument.

6. The system of claim 5, wherein the cleaning blade is fully retracted into the actuator body through the cleaning mechanism during each cycle of the imparted linear motion.

* * * * *